United States Patent
Evans et al.

(10) Patent No.: US 6,799,286 B1
(45) Date of Patent: Sep. 28, 2004

(54) METHODS AND ARRANGEMENTS FOR PROVIDING NON-MODAL ERROR INFORMATION IN A GRAPHICAL USER INTERFACE

(75) Inventors: Christopher A. Evans, Redmond, WA (US); Giampiero M. Sierra, Seattle, WA (US); Jennifer L. Shetterly, Bellevue, WA (US); Satoshi Nakajima, Redmond, WA (US); Todd Berkebile, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/556,494

(22) Filed: Apr. 21, 2000

(Under 37 CFR 1.47)

Related U.S. Application Data

(60) Provisional application No. 60/170,959, filed on Dec. 15, 1999.

(51) Int. Cl.⁷ .............................................. G06F 11/00
(52) U.S. Cl. ......................... 714/57; 345/710; 713/202
(58) Field of Search .................... 714/57, 48; 345/715, 345/811, 710, 705, 808, 706, 708, 709, 809, 780; 713/202

(56) References Cited

U.S. PATENT DOCUMENTS 5,715,415 A * 2/1998 Dazey et al. ............... 345/708
6,020,886 A * 2/2000 Jacober et al. .............. 345/709

* cited by examiner

Primary Examiner—Robert Beausoliel
Assistant Examiner—Christopher S. McCarthy
(74) Attorney, Agent, or Firm—Lee & Hayes, PLLC

(57) ABSTRACT

Methods and arrangements are provided that automatically display error information during a logon process or other similar process. The method and arrangements automatically display error information associated with a user input field through the use of non-modal display mechanisms within a graphical user interface. The method and arrangements monitor user input activities and automatically stop displaying the error information upon subsequent user input. The methods and arrangements may also stop the display of the error information after a defined period of time has elapsed. A tip balloon is one type of a non-modal display mechanism that does require the user to respond and does not interfere graphically and/or operationally with the ongoing graphical user interface supported process.

30 Claims, 3 Drawing Sheets

METHODS AND ARRANGEMENTS FOR PROVIDING NON-MODAL ERROR INFORMATION IN A GRAPHICAL USER INTERFACE

RELATED APPLICATION

This application claims priority from U.S. Provisional Application Serial No. 60/170,959, filed Dec. 15, 1999, the disclosure of which is incorporated by reference herein.

TECHNICAL FIELD

This invention relates to computers and software, and more particularly to methods and arrangements for selectively providing error information, in a non modal manner, within a graphical user interface (GUI) computing environment.

BACKGROUND OF THE INVENTION

Computer systems and other resources are typically protected from inadvertent use and/or otherwise unauthorized access through the use of user names and passwords. The passwords are meant to be secret. Those entering the correct user name and password are allowed to access the protected computing resources, data, etc.

A user may be required to remember several different user names and/or passwords. For example, a user may have a company defined user name at work that is associated with a password of their choosing. The same user may have another user name and password for use with a home network, the Internet, an intranet, a World Wide Web (WWW) page, or the like. Keeping track of these different identifiers can be difficult.

Consequently, a recent trend calls for the inclusion of a user defined password reminder or hint that can be manually requested by the user whenever, he/she cannot remember the password. Thus, for example, if the user's password is "Rover", then the password reminder may be "The name of my first pet when I lived in Michigan". Hence, the user could request this hint when trying to remember "Rover".

One of the drawbacks to this type of password reminder is that the user needs to actively initiate the reminder. Another drawback is that the reminder information is usually displayed in a modal format that retains the focus of the graphical user interface until acknowledged or otherwise explicitly shutdown. Thus, users typically need to ask for the hint and then acknowledge the hint. This tends to waste time and may frustrate certain users.

Some users and system administrators are not enthusiastic about having such reminder information available for all to access. Consequently, these users are left to trial and error techniques as they attempt to recall their password. This process is further frustrated by the type of error messages presented to the user. Typically, a failed password error message is provided in a modal window within the graphical user interface. Such messages are often accompanied by a system "beep" or other sound. Being modal, the error message window demands the user's immediate attention. After only a few attempts, a user can become very frustrated. In many cases, it is contemplated that the additional frustration may further inhibit the user's ability to recall the password.

Thus, it would be advantageous to have improved methods and arrangements that automatically display error information at appropriate times and in more pleasing ways, without requiring any additional user input or interfering with the user's ability to further interact with the graphical user interface.

SUMMARY OF THE INVENTION

Improved methods and arrangements are provided that automatically display error information at appropriate times without requiring any additional user input or interfering with the user's ability to further interact with the graphical user interface.

Thus, for example, the above stated needs and others are met by a method that includes displaying at least one user input field within a graphical user interface, and automatically displaying error information associated with the user input field through a non-modal mechanism within the graphical user interface. The method may include monitoring user input activities and automatically halting the displaying of the error information upon subsequent user input. The method may include automatically halting the display of error information associated with the user input field after a defined period of time has elapsed. A tip balloon is one type of a non-modal display mechanism that does require the user to respond and does not interfere graphically and/or operationally with the ongoing graphical user interface supported process.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
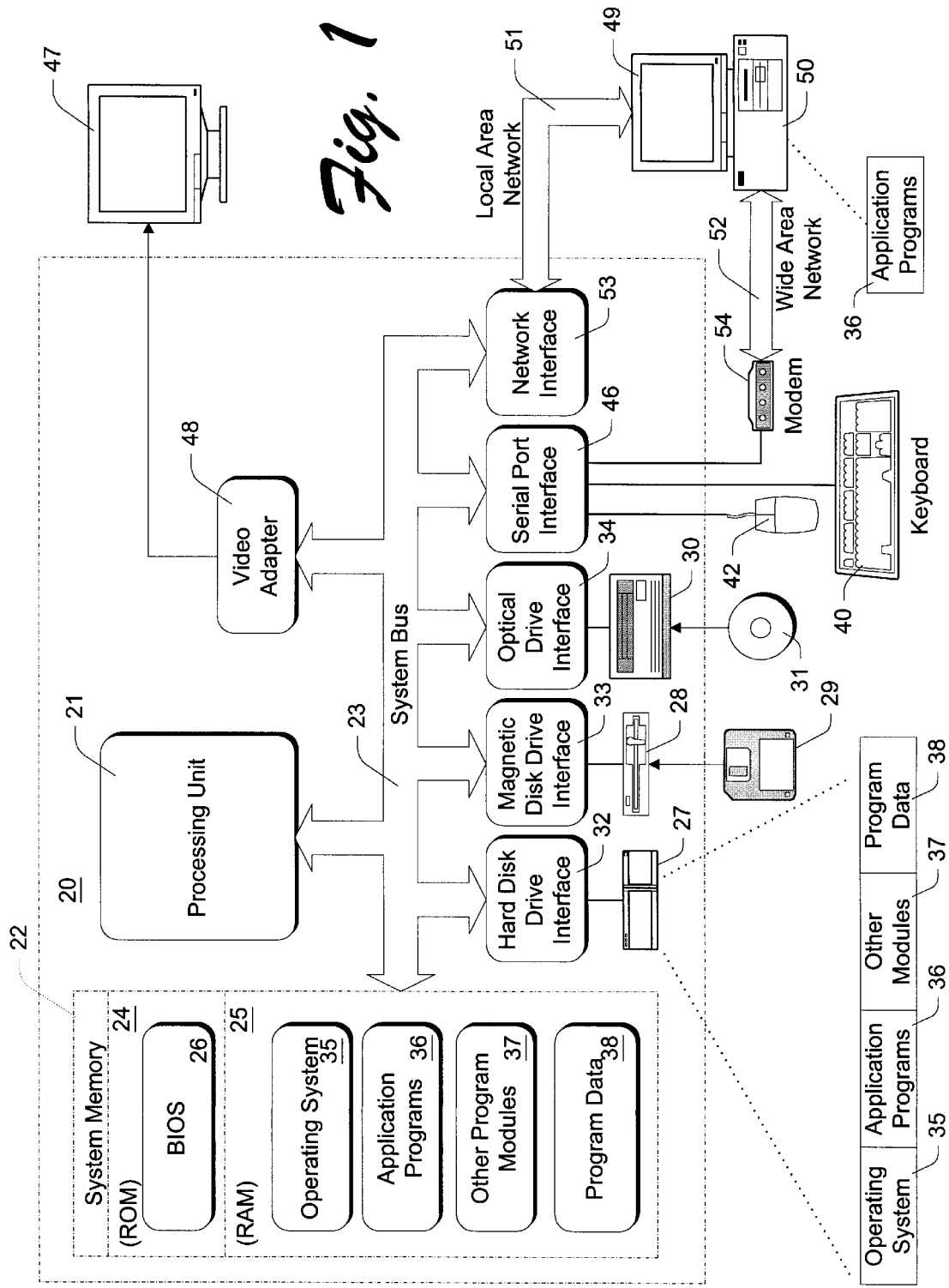
FIG. 1 is a block diagram depicting an exemplary computer system suitable for use in the inputting and the outputting of user logon information.

As shown in FIG. 1, computer 20 includes one or more processors or processing units 21, a system memory 22, and a bus 23 that couples various system components including the system memory 22 to processors 21. Bus 23 represents one or more of any of several types of bus structures, including a memory bus or memory controller, a peripheral bus, an accelerated graphics port, and a processor or local bus using any of a variety of bus architectures.

The system memory includes read only memory (ROM) 24 and random access memory (RAM) 25. A basic input/output system (BIOS) 26, containing the basic routines that help to transfer information between elements within computer 20, such as during start-up, is stored in ROM 24.

Computer 20 further includes a hard disk drive 27 for reading from and writing to a hard disk, not shown, a magnetic disk drive 28 for reading from and writing to a removable magnetic disk 29, and an optical disk drive 30 for reading from or writing to a removable optical disk 31 such as a CD ROM, DVD ROM or other optical media. The hard disk drive 27, magnetic disk drive 28 and optical disk drive 30 are each connected to bus 23 by applicable interfaces 32, 33 and 34, respectively.

The drives and their associated computer-readable media provide nonvolatile storage of computer readable instructions, data structures, program modules and other data for computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into computer 20 through input devices such as keyboard 40 and pointing device 42. Other input devices (not shown) may include a microphone, joystick, game pad, satellite dish, scanner, or the like. These and other input devices are connected to the processing unit 21 through an interface 46 that is coupled to bus 23.

A monitor 47 or other type of display device is also connected to bus 23 via an interface, such as a video adapter 48. In addition to the monitor, personal computers typically include other peripheral output devices (not shown) such as speakers and printers.

Computer 20 can operate in a networked environment using logical connections to one or more remote computers, such as a remote computer 50. Remote computer 50 may be another personal computer, a server, a router, a network PC, a peer device or other common network node, and typically includes many or all of the elements described above relative to computer 20. The logical connections depicted in FIG. 2 include a local area network (LAN) 51 and a wide area network (WAN) 52. Such networking environments are commonplace in offices, enterprise-wide computer networks, intranets, and the Internet.

When used in a LAN networking environment, computer 20 is connected to the local network 51 through a network interface or adapter 53. When used in a WAN networking environment, computer 20 typically includes a modem 54 or other means for establishing communications over the wide area network 52, such as the Internet. Modem 54, which may be internal or external, is connected to bus 23 via interface 46. In a networked environment, program modules depicted relative to the personal computer. 20, or portions thereof, may be stored in the remote memory storage device. It will be appreciated that the network connections shown are exemplary and other means of establishing a communications link between the computers may be used.

Figure 2:
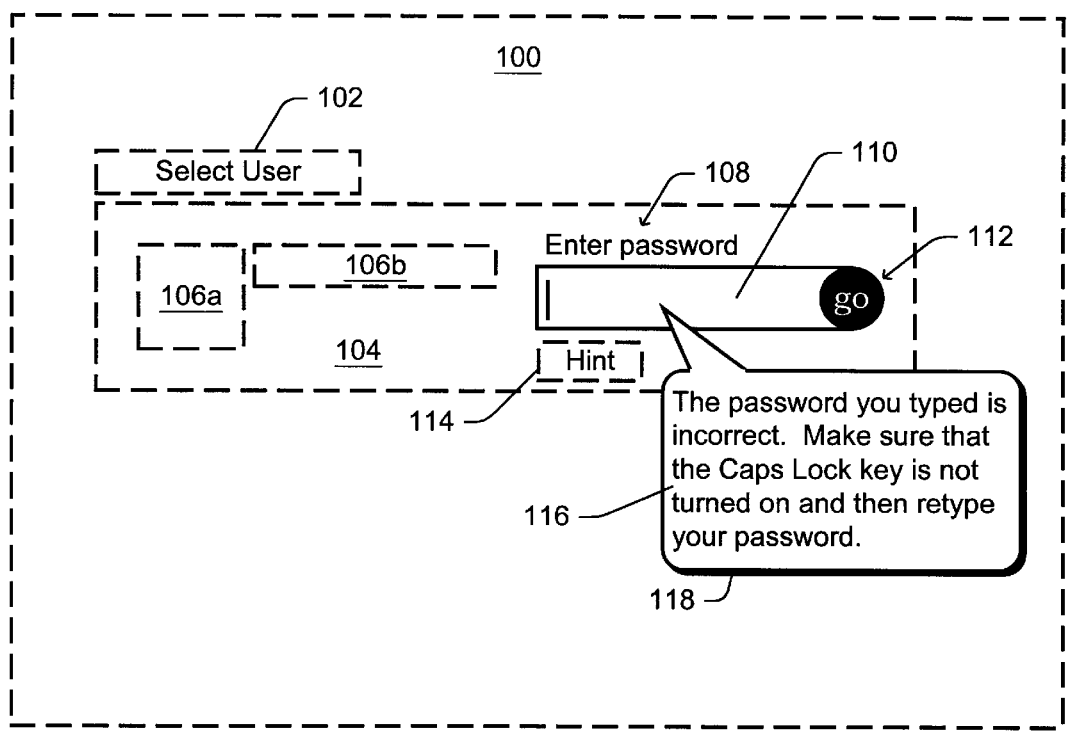
FIG. 2 is an illustrative representation of error information being displayed in a non-modal manner using a computer system, for example, as in FIG. 1.

Reference is now made to FIG. 2, which is an illustrative representation of error information being displayed in a non-modal manner using computer 20. As shown, a non-modal, error balloon 118 is selectively displayed within a graphical user interface (GUI) display 100 on display 47 in an attempt to assist a user attempting to logon to computer 20. Here, the user is told of the error from a previous password entry, and provided with a suggestion about retyping the password with the Caps Lock key off. Those skilled in the art will recognize that other information could be provided through error balloon 118.

Since there are several pieces of information presented to the user within GUI display 100, the following description will walk-through an exemplary user logon process to highlight various aspects.

As shown, the user is initially prompted to select a user identifier through initial prompt 102. The user can respond by viewing one or more user identifier prompts 104. Thus, if computer 20 is configured to support a plurality of users, then a plurality of user identifier prompts 104 can be displayed. In this example, only one user identifier prompt 104 is shown.

Within user identifier prompt 104, there is at least one selectable user area 106. Here, user identifier prompt 104 includes two different selectable user areas 106*a–b*. Selectable user area 106*a* is a graphical, iconic, or like representation associated with the user. For example, selectable user area 106*a* may include a picture of the user. Selectable user area 106*b* is a textual identification associated with the user. Thus, for example, the user's name may be displayed in selectable user area 106*b*.

Once the user has selected a user identifier, then GUI display 100 further provides the user with a password prompt 108 associated with at least one user input field 110. In this example, password prompt 108 and input field 110 are displayed within user identifier prompt 104 following selection of either selectable user area 106*a* or selectable user area 106*b*.

At this stage in the login process, the user will need to input their password in input field 110 and confirm the input by hitting ENTER on their keyboard 40, or by graphically selecting (e.g., clicking) "go" button 112.

If for some reason the user is unable to remember their password, then the user can manually request a "hint" using a manual hint area 114. Manual hint area 114 may include text, graphics, etc. When the user selects manual hint area 114, reminder information 116, which was previously entered by the user during set up, is displayed.

If the password is correct, for example, as determined by the operating system, then the user is logged-on. If the password is incorrect, then the authorizing program generates a corresponding error indicator or other like error data. Corresponding error information 116 is then displayed, as shown in FIG. 2, via error balloon 118. In this example, error balloon 118 points to user input area 110, thereby further relaying information to the user about which field was in error.

Error balloon 118 is non-modal in that it does not significantly interfere with the user's ability to view input field 110 and does not require user acknowledgement in some manner. Moreover, because error balloon 118 can be graphically different from the other portions of GUI display 100, the traditional system beep can be selectively applied.

Error balloon 118 is automatically deactivated when the user begins to retype their password. Thus, there is no need for the user to acknowledge or otherwise shutdown a separate error window. In certain implementations a timing mechanism may be used to deactivate error balloon 118 after it is displayed for a defined period of time. For example, error balloon 118 may only be displayed for about thirty (30) seconds.

Figure 3:
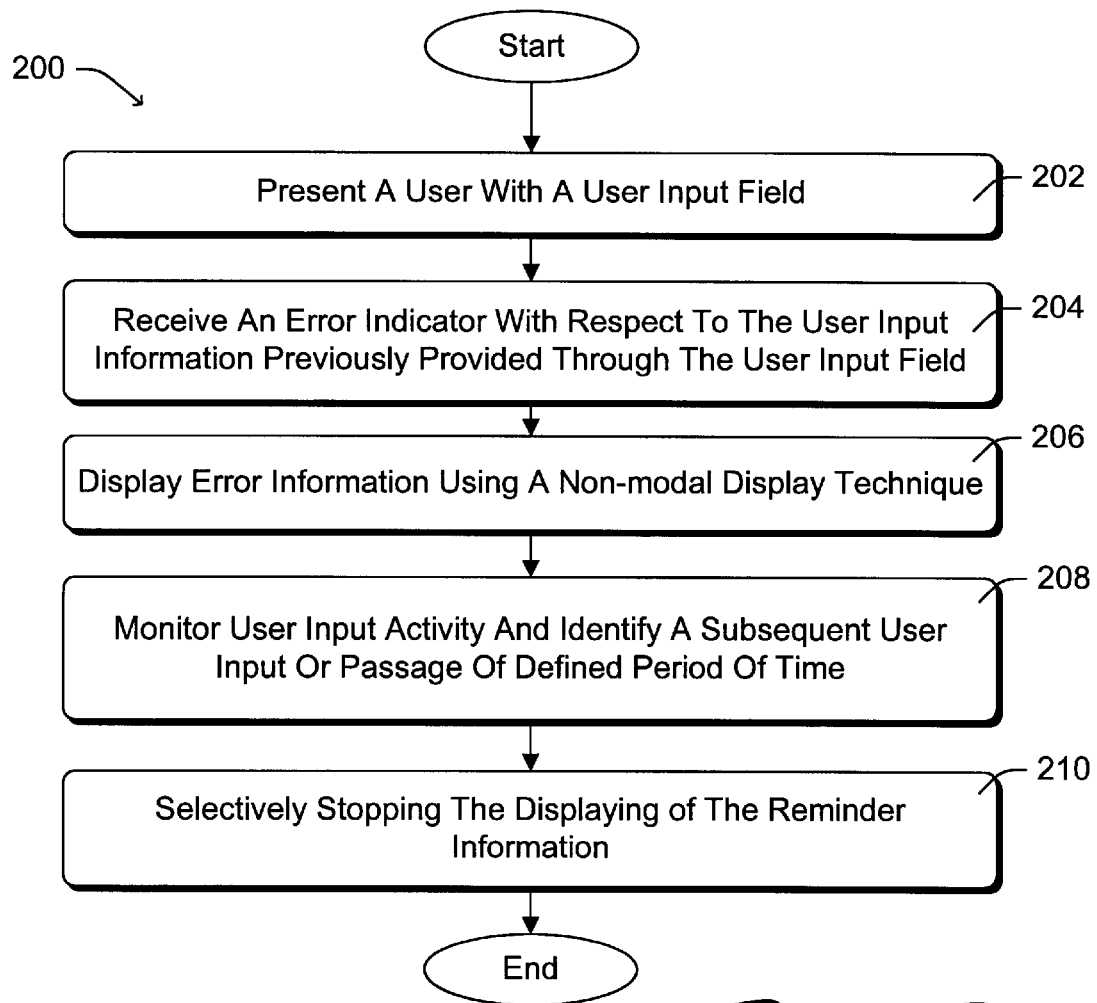
FIG. 3 is flowchart depicting a process for displaying error information in a non-modal manner using a computer system, for example, as in FIG. 1.

FIG. 3 is flowchart depicting a process 200 for selectively displaying error information 116.

In step 202, the user is presented with at least one user input field 110 through GUI display 100. For example, the user may be presented with a password input field. In step 204, a previously entered user input has failed for some reason as demonstrated by the receipt of an error indicator of some type. For example, an operating system may send an error indicator to a logon program following the failure of a password entry.

In step 206, error information is displayed through GUI display 100 using a non-modal mechanism. For example, an error balloon 118 can be used to display error information 116 to the user. Error information 116 can vary depending upon the type of failure, the error indicator or other information.

While the error information is displayed, the user's input activity is monitored, in step 208. Upon a subsequent user input in field 110 or elsewhere within GUI display 100, according to step 210, the display of error information 116 is automatically stopped. Optionally, step 208 may also monitor a timer or like function that causes process 200 to proceed to step 210 upon the passage of a defined period of time. Process 200 may also be configured to be recursive by returning to step 202 from step 210.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
    displaying at least one user input field within a graphical user interface; and
    automatically displaying error information associated with the user input field through a non-modal mechanism within the graphical user interface by monitoring user input activities and automatically halting the display of error information associated with the user input field through the non-modal mechanism upon occurrence of subsequent user input activity.

2. The method as recited in claim 1, wherein the user input field is configured to input a password.

3. The method as recited in claim 2, wherein the error information includes at least one password related suggestion.

4. The method as recited in claim 1, wherein the non-modal mechanism includes a tip balloon.

5. The method as recited in claim 4, wherein the tip balloon is graphically associated with the user input field within the graphical user interface.

6. A method comprising:
    displaying at least one user input field within a graphical user interface; and
    automatically displaying error information associated with the user input field through a non-modal mechanism within the graphical user interface by automatically halting the display of error information associated with the user input field after a defined period of time has elapsed.

7. The method as recited in claim 6, wherein the user input field is configured to input a password.

8. The method as recited in claim 7, wherein the error information includes at least one password related suggestion.

9. The method as recited in claim 6, wherein the non-modal mechanism includes a tip balloon.

10. The method as recited in claim 9, wherein the tip balloon is graphically associated with the user input field within the graphical user interface.

11. A computer-readable medium having computer-executable instructions for performing steps comprising:
    displaying at least one user input field within a graphical user interface; and
    automatically displaying error information associated with the user input field through a non-modal mechanism within the graphical user interface by monitoring user input activities and automatically halting the display of error information associated with the user input field through the non-modal mechanism upon occurrence of subsequent user input activity.

12. The computer-readable medium as recited in claim 11, wherein the user input field is configured to input a password.

13. The computer-readable medium as recited in claim 12, wherein the error information includes at least one password related suggestion.

14. The computer-readable medium as recited in claim 11, wherein the non-modal mechanism includes a tip balloon.

15. The computer-readable medium as recited in claim 14, wherein the tip balloon is graphically associated with the user input field within the graphical user interface.

16. A computer-readable medium having computer-executable instructions for performing steps comprising:
    displaying at least one user input field within a graphical user interface; and
    automatically displaying error information associated with the user input field through a non-modal mechanism within the graphical user interface by automatically halting the display of error information associated with the user input field after a defined period of time has elapsed.

17. The computer-readable medium as recited in claim 16, wherein the user input field is configured to input a password.

18. The computer-readable medium as recited in claim 17, wherein the error information includes at least one password related suggestion.

19. The computer-readable medium as recited in claim 16, wherein the non-modal mechanism includes a tip balloon.

20. The computer-readable medium as recited in claim 19, wherein the tip balloon is graphically associated with the user input field within the graphical user interface.

21. An arrangement comprising:
    memory;
    a display device;
    a user input devices; and
    a processor operatively coupled to the memory, the display device and the user input device, the processor being configured to;
    display at least one us input field wit a graphical user interface;
    automatically display error information associated with the user input field through a non-modal mechanism within the graphical user interface; and
    monitor user input activities and automatically halt the display of error information associated with the user input field through the non-modal mechanism upon occurrence of subsequent user input activity.

22. The arrangement as recited in claim 21, wherein the user input field is configured to input a password.

23. The arrangement as recited in claim 22, wherein the error information includes at least one password related suggestion.

24. The arrangement as recited in claim 21, wherein the non-modal mechanism includes a tip balloon.

25. The arrangement as recited in claim 24, wherein the tip balloon is graphically associated with the user input field within the graphical user interface.

26. An arrangement comprising:
    memory;
    a display device;
    a user input device; and a processor operatively coupled to the memory, the display device and the user input device, the processor being configured to;

display at least one user input field within a graphical user interface;

automatically display error information associated with the user input field through a non-modal mechanism within the graphical user interface; and automatically halt the display of error information associated with the user input field after a defined period of time has elapsed.

27. The arrangement as recited in claim 26, wherein the user input field is configured to input a password.

28. The arrangement as recited in claim 27, wherein the error information includes at least one password related suggestion.

29. The arrangement as recited in claim 26, wherein the non-modal mechanism includes a tip balloon.

30. The arrangement as recited in claim 29, wherein the tip balloon is graphically associated with the user input field within the graphical user interface.

\* \* \* \* \*